United States Patent
Kenney

(10) Patent No.: US 7,068,741 B2
(45) Date of Patent: Jun. 27, 2006

(54) APPROXIMATOR APPARATUS, AND ASSOCIATED METHOD, FOR APPROXIMATING AN N-DIMENSIONAL EUCLIDEAN NORM

(75) Inventor: Thomas J. Kenney, San Diego, CA (US)

(73) Assignee: Nokia Corporation, Espoo (FI)

( * ) Notice: Subject to any disclaimer, the term of this patent is extended or adjusted under 35 U.S.C. 154(b) by 247 days.

(21) Appl. No.: 10/675,576

(22) Filed: Sep. 30, 2003

(65) Prior Publication Data

US 2005/0069058 A1 Mar. 31, 2005

(51) Int. Cl.
H03D 1/00 (2006.01)
H04B 7/10 (2006.01)
(52) U.S. Cl. .................... 375/340; 375/347
(58) Field of Classification Search ........ 375/340, 375/267, 347, 240.16, 240.03, 147
See application file for complete search history.

(56) References Cited

U.S. PATENT DOCUMENTS 5,487,133 A * 1/1996 Park et al. .................. 706/20
6,665,335 B1 * 12/2003 Rajagopal et al. .......... 375/224
6,879,328 B1 * 4/2005 Deering ...................... 345/592
2004/0146117 A1 * 7/2004 Subramaniam et al. ..... 375/260
2005/0025223 A1 * 2/2005 Dabak et al. ............... 375/147

OTHER PUBLICATIONS

M. Barni et al, IEEE 1995 "Optimum linear approximation of the Euclidean norm to speed up vector media filtering".*
Copy of the International Search Report for PCT Application No. PCT/US2004/031882; Filed Sep. 29, 2004.

* cited by examiner

Primary Examiner—Khai Tran
(74) Attorney, Agent, or Firm—Alston & Bird LLP

(57) ABSTRACT

Approximator apparatus, and an associated method, for approximating a Euclidean norm. A transformer transforms component portions of a data symbol into transformed values. And, the transformed values are provided to an estimator. The estimator estimates the Euclidean norm responsive to the transformed values provided thereto. When a higher level Euclidean norm is to be approximated, transforming and estimations are iteratively performed to form successive two dimensional Euclidean norm approximations.

20 Claims, 3 Drawing Sheets

APPROXIMATOR APPARATUS, AND ASSOCIATED METHOD, FOR APPROXIMATING AN N-DIMENSIONAL EUCLIDEAN NORM

The present invention relates generally to a manner by which to approximate an N-dimensional Euclidean norm. More particularly, the present invention relates to approximator apparatus, and an associated method, by which to approximate the value of an N-dimensional Euclidean norm of a data symbol defined in terms of N dimensions.

When implemented to approximate the Euclidean norm of a two dimensional data symbol, increased accuracy of the approximation relative to the accuracy of approximation permitted by conventional approximation apparatus, is achievable. When implemented to approximate the Euclidean norm of a three dimensional data symbol, the approximator apparatus is of significantly reduced complexity relative to conventional approximation apparatus while maintaining high levels of accuracy. And, approximations of Euclidean norms of data symbols of higher level dimensions are also possible, made without necessitating significantly increased circuitry or processing complexity.

The approximator apparatus is advantageously implemented in any communication device, such as a modem forming part of a sending or a receiving station of a CDMA (code-division, multiple-access) cellular communication system in which Euclidean norms are required to be formed to facilitate processing of data symbols of data sequences that are to be communicated during operation of the communication device pursuant to effectuation of a communication service.

BACKGROUND OF THE INVENTION

A communication system is formed, at a minimum, of a sending station and a receiving station, interconnected by a communication channel. Data that is to be communicated between the sending and the receiving stations is converted, by the sending station, into a form to permit its communication upon the communication channel. And, the receiving station operates to recover the informational content of the data, representations of which are detected at the receiving station.

Many varied types of communication systems have been developed and deployed to permit effectuation of many types of communication services. As technological advancements permit, improvements to existing such communication systems are made, and new types of communication systems are developed and deployed.

Amongst the technological advancements that have been implemented in communication systems have been advancements in digital communication techniques. Digital communication techniques, when implemented in a communication system, provide the capability of the communication system more efficiently to utilize the communication resources allocated thereto. By increasing the efficiency by which the communication resources of the communication system are utilized, the communication capacity of the communication system is increased. For instance, the bandwidths of the communication channel extending between the sending and receiving stations of a communication system are sometimes of limited allocations. That is to say, the communication capacity of such a communication system is constrained by the bandwidth available upon the communication channel upon which to communicate data.

A radio communication system is an exemplary type of communication system. In a radio communication system, the communication channel that extends between the sending and receiving station is defined upon a radio link, i.e., a portion of the electromagnetic spectrum. Because data is communicated on radio channels, the need to utilize a wireline, conventionally required in a wireline communication system, upon which to define channels is obviated. Radio communication systems permit for the effectuation of communication services when formation of a wireline connection between the sending and receiving stations is inconvenient or impractical. Additionally, a radio communication system is implementable as a mobile communication system in which one, or both, of the sending and receiving stations is permitted mobility.

A cellular communication system is a type of radio communication system that forms a mobile communication system. In a cellular communication system, mobile stations communicate by way of radio channels defined upon a radio air interface with network based communication stations. Telephonic communication of data, both of voice and of non-voice data, is effectuable pursuant to conventional cellular communication systems. With the implementation of digital communication techniques in cellular communication systems, data-intensive communication services are effectuable.

To facilitate communication of data in such digital cellular communication systems, as well as in other digital communications, data coding schemes have been devised. For instance, channel encoders are regularly utilized that assign symbols to binary representations of data that is to be communicated pursuant to the communication service. Corresponding channel decoders operate in reverse manners to convert detected symbol values into binary form. In some existing cellular communication systems, for instance, QPSK (quadrature phase shift keying) modulation is utilized in which symbols are assigned during channel encoding and modulation operations in which symbols are selected from an allowable, QPSK symbol set. Each symbol is defined in terms of an I-component and a Q-component. The QPSK scheme is a two-dimensional scheme. Other two-dimensional schemes are known and used in some other communication systems. By extension, three dimensional and higher dimensional schemes are also known and are amenable for implementation to facilitate effectuation of communication of data pursuant to a communication service.

Communications devices, such as sending stations and receiving stations, of a digital communication system, are sometimes required to carry out computationally intensive operations. The need to carry out the computationally intensive operations limits the speed at which the communication operations can be carried out and requires complex, and therefore relatively costly circuitry, to carry out such operations. For instance, the operations that are sometimes required to be carried out upon the data include the calculation of Euclidean norms. Calculation of Euclidean norms requires both squaring and square root operations. Euclidean norm calculations are required to be formed, for instance, at modem devices that form parts of the communication stations of a cellular communication system. A modem forming part of a communication device, e.g., of a CDMA based (code-division, multiple-access-based) cellular communication system, must perform Euclidean norm operations pursuant to operations of its various functions, such as searching, dll, transmitting, etc. functions.

Calculating the Euclidean norms in a two dimensional scheme is difficult, particularly when such operations are required to be performed quickly and successively upon successive data symbols of data that is communicated to effectuate a communication service. Calculation of Euclidean norms in higher dimensional schemes become prohibitively complex, particularly at high data rates.

Approximation techniques by which to approximate Euclidean norms are therefore sometimes used in existing systems and proposed for systems that shall utilize multi-dimensional techniques. Approximation techniques are also sometimes used in systems that utilize two-dimensional techniques. To be effective, any approximation technique must be accurate while also being of reduced computational complexity. While various approximation techniques are known to approximate two dimensional Euclidean norms, their application to higher dimensional Euclidean norm approximations also becomes computationally complex. As approximation techniques are presently not generally available for approximating quickly and accurately higher dimensional Euclidean norms, modem devices, as well as other devices, that are to be utilized to operate upon data that is represented in multiple dimensions either inaccurately provide approximations of Euclidean norms or are prohibitively complex and slow.

Accordingly, an improved manner by which to approximate Euclidean norms that is both accurate and computationally noncomplex is required.

It is in light of this background information related to digital communication systems, such as cellular communication systems, that the significant improvements of the present invention have evolved.

SUMMARY OF THE INVENTION

The present invention, accordingly, advantageously provides apparatus, and an associated method, by which to approximate an N-dimensional Euclidean norm.

Through operation of an embodiment of the present invention, a manner is provided by which to approximate the value of an N-dimensional Euclidean norm of a data symbol defined in terms of N dimensions.

An approximation of the Euclidean norm is made in a manner that accurately represents the Euclidean norm while not requiring significant levels of computational complexity to form the approximations.

When the Euclidean norm of a two dimensional data symbol is to be approximated, an approximation is formed that is of increased accuracy relative to the accuracy of an approximation made by a conventional approximation technique.

When the Euclidean norm of a three dimensional symbol is to be formed, an approximation that is both accurate and of significantly reduced complexity relative to conventional approximation techniques is formed.

And, when the Euclidean norm of a higher level, N-dimensional symbol is to be formed, an accurate approximation is obtainable without a corresponding significant increase in complexity of the computations required to form the approximation. When a N-dimensional Euclidean norm is to be approximated, N−1 iterations of a two dimensional approximation are performed in which successive ones of the iterations approximate, iteratively, two dimensional Euclidean norms, successively utilizing successive ones of the component portions of the N-dimensional data symbol. Approximation of an N-dimensional Euclidean norm is thereby made merely through successive iterations of a two dimensional Euclidean norm approximation. Coordinates associated with a prior iteration of a two dimensional Euclidean norm are used for a following calculation of a two dimensional Euclidean norm approximation.

In one aspect of the present invention, a first pair, or other set, of component portions of a data symbol is provided to a transformer. The pair, or other set, of component portions of the data symbol define an angular value. And, the transformer operates to transform, if appropriate, the values provided thereto into an angular value within a selected angular range, e.g., between 0 and pi/4 radians.

And, further, the selected angular range is divided into a first angular subrange and a second angular subrange. The angular value into which the pair, or other set, of component portions of the data symbol are transformed falls within one or the other of the angular subranges. The angular subrange into which the angular value defined by the transformed values falls is determinative of the manner by which the approximation of the Euclidean norm is made. If the angular value falls within the first angular subrange, the Euclidean norm is calculated in the first manner; if the angular value falls within the second angular subrange, the Euclidean norm is approximated in a second manner.

In one implementation, the Euclidean norm approximations are performed at a modem device of a communication station operable in a CDMA cellular communication system. During operation of the modem device, successive data symbols forming data that is communicated to effectuate a communication service are applied to the modem device. Amongst the operations that are performed upon the data symbols are approximations of Euclidean norms. The approximator operates to form an approximation of the Euclidean norm of the data symbol, responsive to the values provided thereto. If a multi dimensional Euclidean norm is to be obtained, the approximation is formed pursuant to an iterative process in which successive two dimensional Euclidean norm approximation values are calculated such that after a desired iteration, the multi dimensional Euclidean norm approximation value is obtained.

Because the approximation that is formed is both accurate and obtained without the need to perform complex computations, the approximator and its associated method of approximating is advantageously utilized when operations are to be performed upon large numbers of input data, such as data symbols that are to be communicated pursuant to a data communication service. When a two-dimensional Euclidean norm is to be approximated, improved accuracy relative to conventional approximation techniques is provided. And, higher level Euclidean norm approximations are formable while conventional techniques are computationally prohibitively high.

In these and other aspects, therefore, an approximator, and an associated method, is provided for a communication device. The approximator forms an approximation of a Euclidean norm of a data symbol defined in terms of a first component portion and at least a second component portion. A detector is adapted to receive indications of the first and at least second component portions of the data symbol. A transformer is coupled to the detector. The transformer transforms the component portion into a first transformed value and transduces the second component portion into a second transformed value. The first and second transformed values, respectively, formed by the transformer are selected such that a geometric argument defined therefrom is within a selected angular range. An estimator is adapted to receive the first and second transformed values. The estimator estimates the Euclidean norm of the data symbol. The Euclidean norm is estimated to be a summation of a first product formed from the first transformed value and a second product value formed from the second transformed value.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
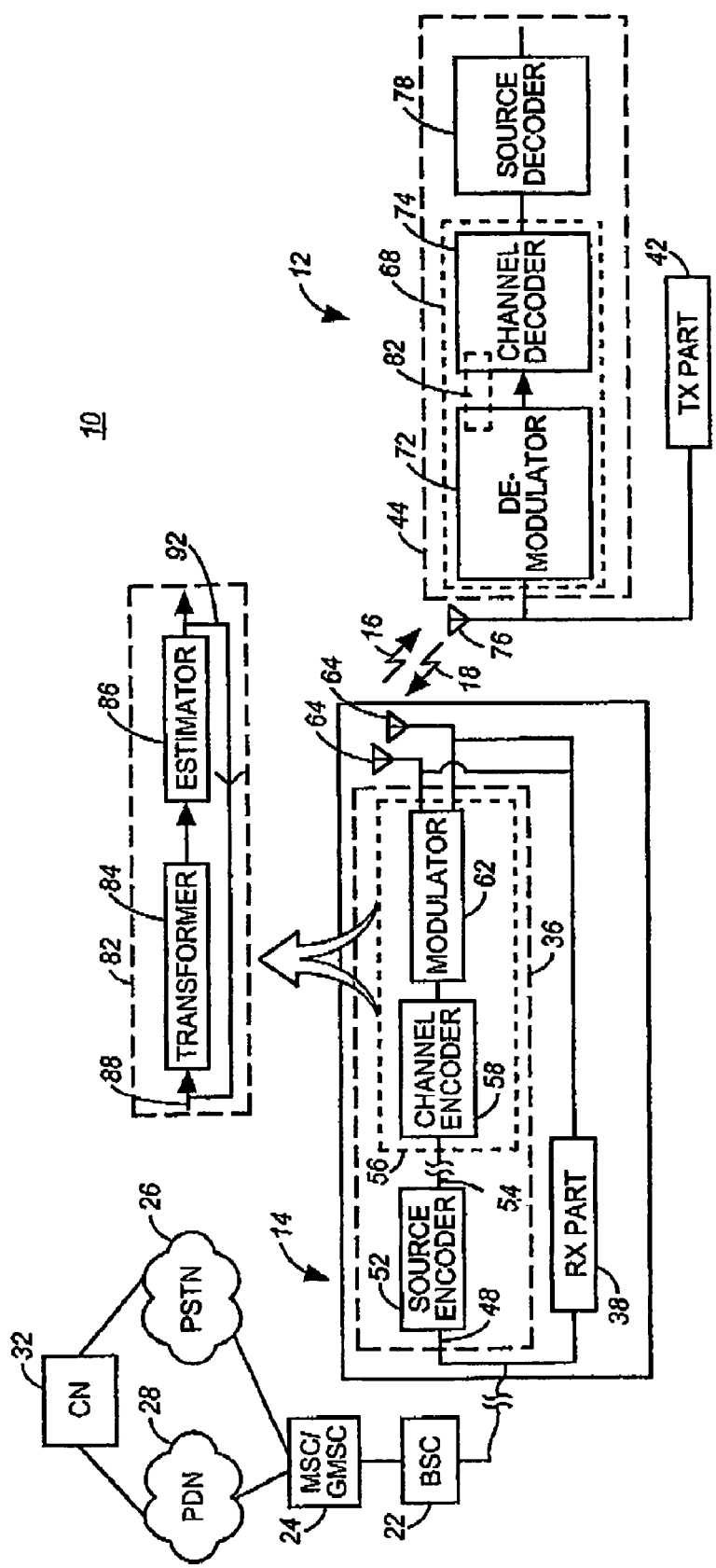
FIG. 1 illustrates a functional block diagram of a radio communication system in which an embodiment of the present invention is operable.

Referring first to FIG. 1, a radio communication system, shown generally at 10, provides for radio communications between mobile stations, of which the mobile station 12 is representative, and a network part. In the exemplary implementation, the communication system forms a cellular communication system operable generally pursuant to an operating specification that utilizes code division, multiple-access (CDMA) communication techniques. The communication system is also representative of other types of cellular communication systems. And, more generally, the communication system 10 is representative of any of various other types of digital communication systems in which digital communication stations are interconnected by way of a communication channel. Accordingly, while the following description of exemplary operation of the present invention shall be described with respect to its implementation in which the communication system forms a CDMA-based, cellular communication system, the teachings of the present invention are analogously also applicable with respect to its implementation in other types of communication systems.

The network part of the communication system includes a base transceiver station 14 with which the mobile station 12 communicates by way of radio channels defined upon a radio air interface extending therebetween. Here, arrows 16 and 18 are representative of a forward link and a reverse link, respectively, upon which forward link and reverse link channels are defined. Data originated at the mobile station 12 for communication to the network part of the communication system is converted into a form to permit its communication upon reverse link channels defined upon the reverse link 18. And, analogously, data originated at the network part for communication to the mobile station is converted into a form to permit its communication upon forward link channels defined upon the forward link 16 to the mobile station.

The network part of the communication system includes further functional entities, here including a base station controller (BSC) 22 and a mobile switching center (MSC) 24. The base station controller is coupled to groups of base transceiver stations, of which the base transceiver station is representative. The base station controller operates, amongst other things, to control operation of the base transceiver stations to which the base station controller is coupled. The mobile switching center, in turn, is coupled to groups of base station controllers, of which the base station controller 22 is representative, and forms a switching center, or otherwise forms a gateway to external networks, here a PSTN (public switched telephonic network) and a packet data network (PDN) 28. A correspondent node (CN) 32 is coupled to both of the networks. The correspondent node is representative of a data source or a data sink that forms an ultimate source or destination of data that is communicated with the mobile station 12.

The mobile station and the base transceiver station each include radio transceiver circuitry permitting both transmission and reception of data by way of the radio air interface formed therebetween. The base transceiver station, accordingly, includes a transmit part 36 and a receive part 38. And, the mobile station includes a transmit part 42 and a receive part 44. Data to be communicated by the base transceiver station to the mobile station is communicated by the transmit part 36 and detected by the receive part 44 of the mobile station. And, the data that is to be communicated by the mobile station is communicated by the transmit part 42 upon the radio air interface to be detected by the receive part 38. Operation of an embodiment of the present invention shall be described with respect to the generation and communication of data upon the forward link by the transmit part 36 of the base transceiver station for delivery to the receive part of the mobile station. Operation of the transmit part 42 and receive part of the mobile station and base transceiver station operate analogously.

Data that is to be communicated by the network part to the mobile station is provided to the base transceiver station by way of the line 48. The data is applied to a source encoder 52. The source encodes the data and generates source encoded data on the line 54. Representations of the source encoded data is provided to a modem 56, here formed of a channel encoder 58 and a modulator/mapper 62. The data applied to the modem is channel encoded by the channel encoder and modulated by the modulator 62. Once modulated, the data is provided to an antenna transducer 64. When the base transceiver station is of a multiple antenna formation, the modulator also forms mapping functions to map the data to selected ones of the antennas 64.

Once transduced into electromagnetic form, the data is communicated upon one or more forward link channels to be detected by the receive part 44 of the mobile station. The receive part of the mobile station includes functional elements corresponding to, but operating generally reverse to that of, the transmit part of the base transceiver station. More particularly, the receive part of the mobile station includes a modem 68 that includes a demodulator 72 and a channel decoder 74. The demodulator demodulates data detected at the antenna 76 of the mobile station. The channel decoder channel decodes the demodulated data applied thereto. A source decoder 78 also forms part of the receive part of the mobile station.

In the exemplary implementation, digital communication techniques are utilized, and a communication service effectuated pursuant to operation of the communication system is effectuated through the communication of sequences of data symbols that together form the data that is to be communicated between communication stations of the communication system. Mathematical operations must be performed upon successive symbols of the data sequence. For instance, at the modem devices 56 and 68, determinations of Euclidean norms associated with the successive data symbols must be made. As noted previously, Euclidean norm calculations are computationally intensive, sometimes prohibitively so. Manners by which to approximate, or otherwise estimate, the Euclidean norm, are therefore needed. Existing schemes are, however, practically unavailable when higher dimensional Euclidean norms are to be approximated. And, in two dimensions, improved accuracy of the approximation would be beneficial.

Accordingly, apparatus, shown generally at 82, of an embodiment of the present invention is provided by which to approximate Euclidean norms in any of N dimensions. Two dimensional, three dimensional, etc. Euclidean norms are approximated through operation of the apparatus 82. At higher dimensions, approximations are performed iteratively, taking advantage of prior calculations to form successive two dimensional approximations, based upon prior calculated approximations during the iterative process.

The apparatus 82 is formed of functional entities, here shown in functional form, but implementable in any desired manner. In one implementation, for instance, the apparatus 82 forms an ASIC. In another implementation, the apparatus is implemented as algorithms executable by processing circuitry. Other implementations of the apparatus are analogously possible. Here, the apparatus is formed of a transformer 84 an estimator 86. The transformer 84 is provided, here on the line 88, with indications of component portions of a data symbol that is to be operated upon to obtain an approximation of the Euclidean norm thereof. The transformer transforms the component portions into transformed values, and transformed values are provided to the estimator 86. The estimator estimates a Euclidean norm based upon the transformed values provided thereto. A feedback loop 92 is also represented in the Figure. When a higher level dimension, i.e., greater than two, the feedback loop is utilized to provide indications associated with the estimated Euclidean norm in a subsequent iteration of the approximation process. When only a two dimensional Euclidean norm is to be formed, iterative operation of the apparatus is not required, and the loop 92 is not utilized. Analogous structure of the apparatus 82 is also embodied at the mobile station 12, also operable to approximate N dimensional Euclidean norms, as necessary.

When QPSK modulation techniques are utilized, two dimensional quadrature signal pairs are applied to the apparatus 82 and the approximations of the Euclidean norm thereof are made in a single pass. When higher level modulation techniques are utilized, iterative operation of the apparatus is performed.

Mathematical analysis and operation of the apparatus follows.

In the exemplary implementation, the design is to approximate the magnitude of a quadrature signal pair (i.e., approximate: $R=\sqrt{I^2+Q^2}$, where I and Q represent the quadrature signal pair). First, since only the magnitude is needed, a the following simple transformation to rotate the complex point z=I+jQ such that its argument lies between 0 and $\pi/4$ is made $$x=\max(|I|,|Q|)$$

$$y=\min(|I|,|Q|). \tag{1}$$

And therefore $$R=\sqrt{x^2+y^2} \quad 0 \leq \theta \leq \pi/4 \tag{2}$$

Since a fixed magnitude lies on an arch in the 2-D space the following approximation is made $$\hat{R}=ax+by=R(a\cos\theta+b\sin\theta) \tag{3}$$

Thus the relative error is given by $$e(\theta) = \frac{R - \hat{R}}{R} = 1 - a\cos\theta - b\sin\theta \tag{4}$$

Next the arch described in (3) is then divided into two regions region I: $0 \leq \theta \leq \theta_o$ region II: $\theta_o \leq \theta \leq \pi/4$ \tag{5}

This division into two regions is used to improve the approximation by optimizing the solution based on the location of the complex point. Thus two solutions are formed and depending on the location the appropriate equation is chosen.

Figure 2:
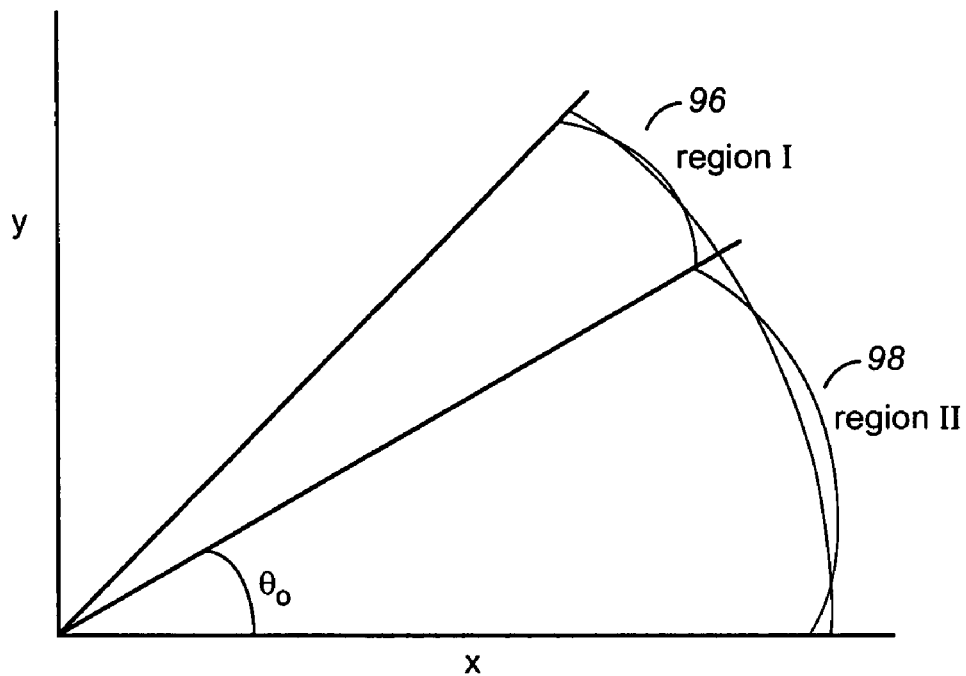
FIG. 2 illustrates a graphical representation of angular subregions defined pursuant to an embodiment of the present invention by which to approximate an N-dimensional Euclidean norm.

FIG. 2 illustrates the two-region approach showing both the actual magnitude and the approximation. Two regions, region I 96 and region II 98, are represented. Since the two arcs intersect at two points in each region there are four values where the error is zero. Additionally, it is clear that error achieves its peak amplitude at three points in each region, the mid and end points. The equiripple error criteria is meet in the two regions by setting region I: $|e(0)|=|e(\theta_{max,I})|=|e(\theta_o)|$ \tag{6} region II: $|e(\theta_o)|=|e(\theta_{max,II})|=|e(\pi/4)|$ where, as can be seen in FIG. 2, for region I:

$$|e(\theta_o)| = \left|e\left(\frac{\theta_o}{2}\right)\right| = |e(\pi/4)|$$

and for region II:

$$|e(\theta_o)| = \left|e\left(\frac{\pi/4 - \theta_o}{2}\right)\right| = |e(\pi/4)|.$$

Using the expressions in (4) and (6) the following set of equations are formed

Region I:

$|e(0)|=1-a$ $-|e(\theta_o/2)|=1-a\cos(\theta_o/2)-b\sin(\theta_o/2)$ \tag{7}

$|e(\theta_o)|=1-a\cos\theta_o-b\sin\theta_o$

Region II:

$$|e(\theta_o)| = 1 - a\cos\theta_o - b\sin\theta_o \tag{8}$$

-continued $$-\left|e\left(\frac{\pi/4-\theta_o}{2}\right)\right| = 1 - a\cos\left(\frac{\pi/4-\theta_o}{2}\right) - b\sin\left(\frac{\pi/4-\theta_o}{2}\right)$$

$$|e(\pi/4)| = 1 - a\cos(\pi/4) - b\sin(\pi/4)$$

First region I is considered. Defining, for clarity, $e_I = |e(0)| = |e(\theta_o/2)| = |e(\theta_o)|$ reordering terms and using the double angle identities: $\cos 2A = 2\cos^2 A - 1$ and $\sin 2A = 2\cos A \sin A$, equation (7) can be rewritten as Region I:

$$b\sin(\theta_o/2) + a\cos(\theta_o/2) - e_I - 1 = 0 \quad (9)$$

$$2b\sin(\theta_o/2)\cos(\theta_o/2) + a\{2\cos^2(\theta_0/2) - 1\} + e_I - 1 = 0$$

$$0 + a + e_I - 1 = 0$$

Next if line 1 of (9) is multiplied by $-2\cos(\theta_o/2)$ and then added to line 2 of (9)

$$b\sin(\theta_o/2) + a\cos(\theta_o/2) - e_I - 1 = 0 \quad (10)$$

$$0 - a + e_I(2\cos(\theta_0/2) + 1) + (2\cos(\theta_o/2) - 1) = 0$$

$$0 + a + e_I - 1 = 0$$

Continuing, line 2 is added to line 3 of (10)

$$b\sin(\theta_o/2) + a\cos(\theta_o/2) - e_I - 1 = 0 \quad (11)$$

$$0 - a + e_I(2\cos(\theta_0/2) + 1) + (2\cos(\theta_o/2) - 1) = 0$$

$$0 + 0 + 2e_I(2\cos(\theta_0/2) + 1) + (2\cos(\theta_o/2) - 1) = 0$$

Solving line 3 of (11) gives $$e_I = \tan^2\{\theta_o/4\} \quad (12)$$

where again the double angle identity was used.

Using (4) and (6), as was done above to determine $|e(\theta_{max,I})|$, both a and b can also be found. Since the math is tedious the detailed solution for a and b will also be omitted. The solution, however, provides the following Region I:

$$a = \frac{2}{1 + \sec(\theta_o/2)} \quad (13)$$

$$b = 2\tan(\theta_o/4)$$

$$|e(\theta_{max,I})| = \tan^2(\theta_o/4)$$

Region II:

$$a = \frac{\sqrt{2}(1 - \sqrt{2}\sin\theta_o)}{2\sin\frac{1}{2}(\frac{\pi}{4} - \theta_o) + \cos(\frac{\pi}{4} - \theta_o)} \quad (14)$$

$$b = \frac{\sqrt{2}(\sqrt{2}\cos\theta_o - 1)}{2\sin\frac{1}{2}(\frac{\pi}{4} - \theta_o) + \cos(\frac{\pi}{4} - \theta_o)}$$

$$|e(\theta_{max,II})| = \tan^2\frac{1}{4}(\frac{\pi}{4} - \theta_o)$$

Figure 3:
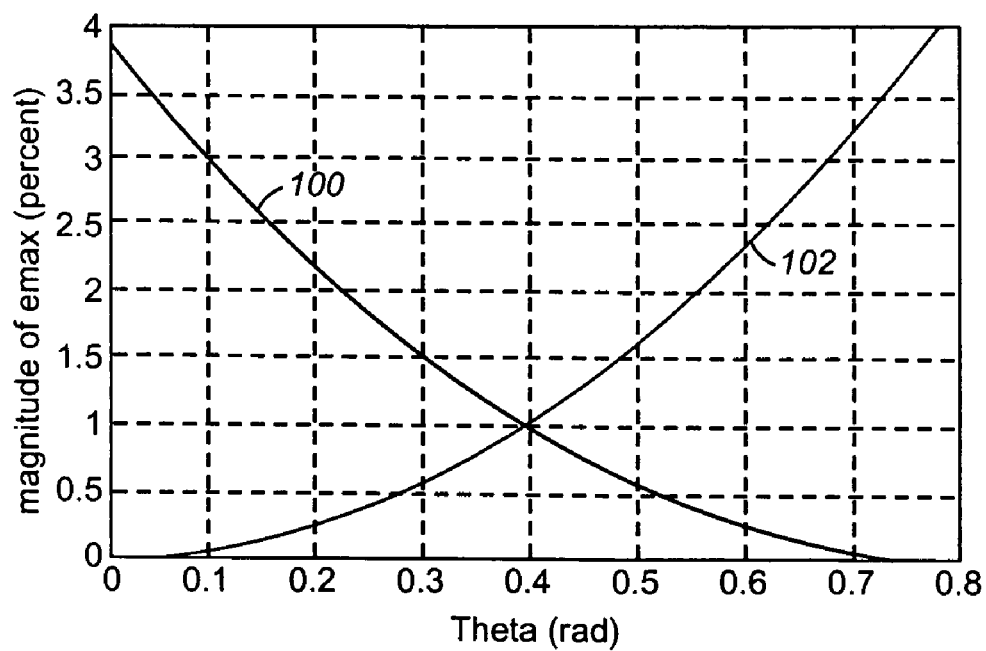
FIG. 3 illustrates graphical representations of error curves that indicate maximum error percentages of approximations generated during operation of an embodiment of the present invention.

The maximum error percentage for Region I and Region II are given in (13) and (14) respectively. FIG. 3 plots the two error curves 100 and 102 as a function of the angle of separation. Additionally, equating the two error expressions in (13) and (14) provides the optimal selection of the angle of separation:

$$|e(\theta_{max,I})| = |e(\theta_{max,II})| \quad (15)$$

$$\tan^2(\theta_o/4) = \tan^2\frac{1}{4}(\frac{\pi}{4} + \theta_o)$$

$$(\theta_o/4) = \frac{1}{4}(\frac{\pi}{4} + \theta_o)$$

$$\theta_o = \frac{\pi}{8}$$

As seen in FIG. 3, the point at which both regions have equal maximum errors is 0.393 radians as was shown in (15). Although this angle indeed provides the best solution it does so with some implementation complexity.

To determine in which of the two regions the argument lies requires a division, and the number of bits in that division must be reasonable large. Other techniques can be used to determine the region, which are more conducive to an ASIC implementation, but which do so at some cost in performance. One approach that readily allows this reduction is to make $\theta_0$ a function of $\tan^{-1}(\ )$. This assignment is clearly advantageous when considering that the desire is to approximate the magnitude of a quadrature signal. Two likely candidates are $$\theta_o = \tan^{-1}\left(\frac{1}{2}\right)$$

and $$\theta_o = \tan^{-1}\left(\frac{1}{4}\right)$$

these require only shift operations of the quadrature components in order to determine the region.

This in itself does not completely address the entire complexity issue. Solving for the coefficients a and b using either the optimal, or one of the two aforementioned approximations, for $\theta_o$ requires a non-multiple-of-two multiplication. Therefore quantization of a and b is required.

The following table shows the mathematical process, and its hardware implementations, by which to approximate a 2D-Euclidean norm.

Fast Algorithm Details

| Fast Algorithm | Fast Algorithm – Detailed Hardware implementation |
|---|---|
| x = max(\|I\|, \|Q\|)<br>y = min(\|I\|, \|Q\|).<br>if(x > 4y)<br>$\hat{R} = x$<br>else<br>$\hat{R} = \frac{7}{8}x + \frac{1}{2}y$ | If(\|I\| >= \|Q\|)<br>  x = \|I\|<br>  y = \|Q\|<br>else<br>  x = \|I\|<br>  y = \|Q\|<br>if{x > (y<< 2)}<br>  $\hat{R} = x$<br>else<br>  $\hat{R} = x - (x >> 3) + (y >> 1)$ |

Pursuant to another implementation, the following tables show the mathematical processes, and hardware implementations, by which to approximate two dimensional Euclidean norms.

| Fast Algorithm | Algorithm – Detailed Hardware implementation |
|---|---|
| x = max(\|I\|, \|Q\|)<br>y = min(\|I\|, \|Q\|).<br>if(x >= 2y)<br>$\hat{R} = \frac{63}{64}x + \frac{1}{4}y$<br>else<br>$\hat{R} = \frac{7}{8}x + \frac{1}{2}y$ | If(\|I\| >= \|Q\|)<br>  x = \|I\|<br>  y = \|Q\|<br>else<br>  x = \|I\|<br>  y = \|Q\|<br>if{x > (y<< 1)}<br>  $\hat{R} = x - (x >> 6) + (y >> 2)$<br>else<br>  $\hat{R} = x - (x >> 3) + (y >> 1)$ |

| Fast Algorithm | Algorithm – Detailed Hardware implementation |
|---|---|
| x = max(\|I\|, \|Q\|)<br>y = min(\|I\|, \|Q\|).<br>if(x >= 2y)<br>$\hat{R} = \frac{31}{32}x + \frac{1}{4}y$<br>else<br>$\hat{R} = \frac{7}{8}x + \frac{1}{2}y$ | If(\|I\| >= \|Q\|)<br>  x = \|I\|<br>  y = \|Q\|<br>else<br>  x = \|I\|<br>  y = \|Q\|<br>if{x > (y<< 1)}<br>  $\hat{R} = x - (x >> 5) + (y >> 2)$<br>else<br>  $\hat{R} = x - (x >> 3) + (y >> 1)$ |

In another implementation, particularly amenable for use when the apparatus is DSP-, or otherwise software-, implemented, the procedures set forth in the following table are carried out.

| Fast Algorithm | Algorithm – Detailed Hardware implementation |
|---|---|
| x = max(\|I\|, \|Q\|)<br>y = max(\|I\|, \|Q\|).<br>if (x >= 0.3927y)<br>$\hat{R} = \frac{2}{1 + \sec(\theta_o/2)}x + 2\tan(\theta_o/4)y$<br>else<br>$\hat{R} = \frac{\sqrt{2}\left(1 - \sqrt{2}\sin\theta_o\right)}{2\sin\frac{1}{2}\left(\frac{\pi}{4} - \theta_o\right) + \cos\left(\frac{\pi}{4} + \theta_o\right)}x +$<br>$\frac{\sqrt{2}\left(\sqrt{2}\cos\theta_o - 1\right)}{2\sin\frac{1}{2}\left(\frac{\pi}{4} - \theta_o\right) + \cos\left(\frac{\pi}{4} + \theta_o\right)}y$ | If(\|I\| >= \|Q\|)<br>  x = \|I\|<br>  y = \|Q\|<br>else<br>  x = \|I\|<br>  y = \|Q\|<br>if(x > 0.3927y)<br>  $\hat{R} = .9903x + .197y$<br>else<br>  $\hat{R} = .8395x + .5610y$ |

Approximation of the Euclidean norm is also possible in three dimensions. In the exemplary implementation, the implementation set forth above is extended to three dimensions.

Figure 4:
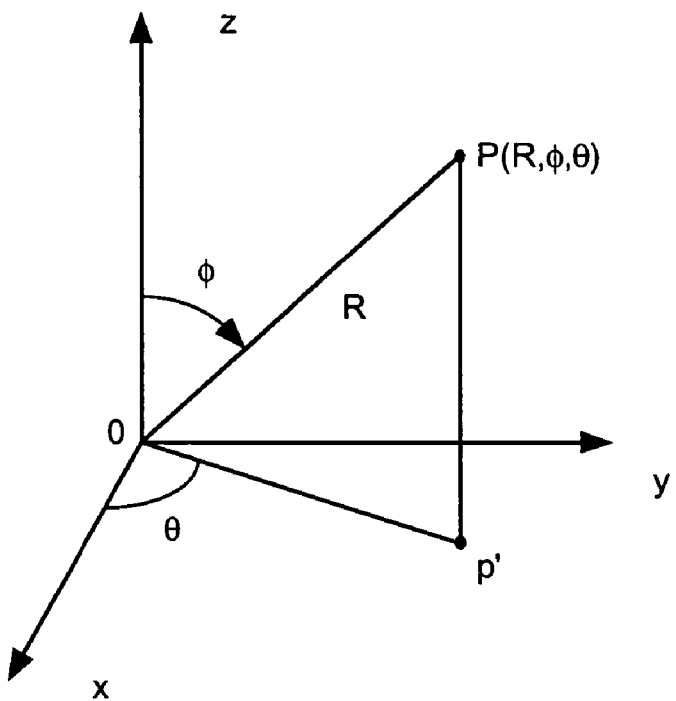
FIG. 4 illustrates a graphical representation of a manner by which a Euclidean norm, of any of N dimensions is approximated pursuant to operation of an embodiment of the present invention.

For clarity, the development of the N-dimensional solution will be presented using a 3-D example. This will then be generalized for higher dimensions. The problem of approximating the Euclidean norm is depicted in FIG. 4 where the norm is represented by $|\overrightarrow{OP}|$. The point, P is located at [x,y,z] in rectangular coordinates.

Mapping to spherical coordinates is done as:

$$x = R\sin\phi\cos\theta,\ y = R\sin\phi\sin\theta,\ z = R\cos\phi \quad (16)$$

Again, as in the 2-D problem, the task is to estimate the Euclidean norm $$R = \sqrt{x^2 + y^2 + z^2}\quad 0 \leq \theta \leq \pi/4,\ 0 \leq \phi \leq \pi/2. \quad (17)$$

Where now three arguments are used for the three dimensions. If the same approach as in the 2-D problem an estimate may be formed as $$\hat{R} = ax + by + cz = R(a\cos\theta\sin\phi + b\sin\theta\sin\phi + c\cos\phi) \quad (18)$$

Therefore the relative error is given by $$e(\theta) = \frac{R - \hat{R}}{R} = 1 - a\cos\theta\sin\phi - b\sin\theta\sin\phi - c\cos\phi \quad (19)$$

The equiripple error criteria is meet in the two regions by setting region I: $|e(0,0)| = |e(\theta_{max,I}, \phi_{max,I})| = |e(\theta_o, \phi_o)|$ (20)

region II: $|e(\theta_o, \phi_o)| = |e(\theta_{max,II}, \phi_{max,II})| = |e(\pi/4, \pi/4)|$ The solution is attained by solving (19) and (20) for the unknowns a, b and c with the assignment of $\theta_o = \phi_o = \pi/8$ as was found previously for the 2-D problem. This solution is relatively complex and it is questionable whether the approximation approach is less complex then the actual solution.

The approach to solve the 3-D problem is vastly more complicated then that of the 2-D problem. Thus a novel approach was used whereby the 3-D problem was reduced to two 2-D problems and then solved iteratively. The solution is as follows: First a set of 2-D components are used to find the magnitude in 2-D space using one of the approaches outlined previously. Next, the resultant magnitude and remaining unused 3-D component are used to form a second 2-D set. Again using one of the approaches outline in Section 2 the magnitude is computed to provide a final approximation to the original 3-D Euclidean norm.

Stated another way, first a 2-D magnitude is found using the points (x,y), then the x-axis (arbitrary selection) is rotated by θ to the resultant vectors position (O,P') creating the x' axis. Next a second 2-D problem is solved using the x' and z axis.

The following steps outline the algorithm used to find the Euclidean norm for a 3-dimension problem given (X,Y,Z);

1.) Find:

$x = \max(|X|,|Y|)$ $y = \min(|X|,|Y|)$.

2.) Approximate the 2-D magnitude, $\hat{R}$, using one of the approaches outlined previously.

3.) Next, rotate the x-axis to form the x' axis and define:

$x = \max(|\hat{R}|,|Z|)$ $y = \min(|\hat{R}|,|Z|)$.

4.) Next approximate this second 2-D magnitude using again one of the approaches from Section 2 for $\hat{R}$ attaining the final 3-D Euclidean norm approximation.

Figure 5:
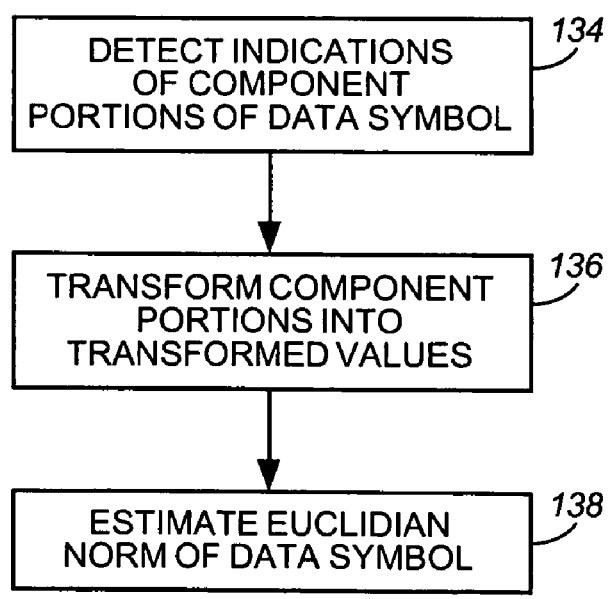
FIG. 5 illustrates a method flow diagram of the method of operation of an embodiment of the present invention.

FIG. 5 illustrates a method, shown generally at 132, representative of the method of operation of an embodiment of the present invention. The method forms an approximation of the Euclidean norm of a data symbol defined in terms of a first component portion and at least a second component portion.

First, and as indicated by the block 134, indications of the first and at least second component portions of the data symbol are detected. Then, and as indicated by the block 136, the first component portion is transformed into a first transformed value and the second component portion is transformed into a second transformed value. The first and the second transformed values are selected such that the geometric argument defined therefrom is within a selected angular range. Then, and as indicated by the block 138, the Euclidean norm of the data symbol is estimated. The Euclidean norm is estimated to be the summation of the first product value formed from the first transformed value and a second product value formed from the second transformed value.

Higher level Euclidean norm approximations are performed by an iterative procedure in which two dimensional Euclidean norm approximations are successively made to form the approximation of the N dimensional Euclidean norm. Accurate approximations are obtained without necessitating excessive computations. Thereby, approximations of Euclidean norms at higher dimensions are possible at high rates, such as in modem devices operable to form parts of communication stations of a cellular communication system that provides high speed data services.

The previous descriptions are of preferred examples for implementing the invention, and the scope of the invention should not necessarily be limited by this description. The scope of the present invention is defined by the following claims.

The invention claimed is:

1. In a digital communication device, an improvement of an approximator for forming an approximation of a Euclidean norm of a data symbol defined in terms of a first component portion and at least a second component portion, said approximator comprising:
a detector adapted to receive indications of the first and at least second component portions of the data symbol;
a transformer coupled to said detector, said transformer for transforming the first component portion into a first transformed value and for transducing the second component portion into a second transformed value, the first and second transformed values, respectively, formed by said transformer selected such that a geometric argument defined therefrom is within a selected angular range; and
an estimator adapted to receive the first and second transformed values, respectively, said estimator for estimating the Euclidean norm of the data symbol, the Euclidean norm estimated to be a summation of a first product value formed from the first transformed value and a second product value formed from the second transformed value.

2. The approximator of claim 1 wherein the selected angular range is comprised of a first angular subrange and a second angular subrange and wherein the first product value and the second product value used by said estimator are further dependent upon in which of the first angular subrange and the second angular subrange that the geometric argument defined by the first and second transformed values is positioned.

3. The approximator of claim 2 wherein the first angular subrange extends between a zero radian and a selected angular radian value, wherein the second angular subrange extends between the selected angular radian value and a pi/4 radian value, and wherein the first and second product values, respectively, are further formed from the selected angular radian value.

4. The approximator of claim 1 wherein the first product value used by said estimator is formed of a first multiplicand multiplied together with the first transformed value and wherein the second product value used by said estimator is formed of a second multiplicand multiplied together with the second transformed value.

5. The approximator of claim 1 wherein the selected angular range is comprised of a first angular subrange and a second angular subrange, wherein a first multiplicand is determined in a first selected manner when the geometric argument defined by the first and second transformed values is positioned within the first angular subrange, and wherein the first multiplicand is determined in a second selected manner when the geometric argument defined by the first and second transformed values is positioned within the second angular subrange.

6. The approximator of claim 4 wherein the selected angular range is comprised of a first angular subrange and a second angular subrange, wherein the second multiplicand is determined in a first selected manner when the geometric argument defined by the first and second transformed values is positioned within the first angular subrange, and wherein the second multiplicand is determined in a second selected manner when the geometric argument defined by the first and second transformed values is positioned within the second angular subrange.

7. The approximator of claim 1 wherein the data symbol is comprised of the first component portion and the second component portion, the first and second component portions forming a quadrature signal pair, and wherein said estimator estimates the Euclidean norm of the quadrature signal pair.

8. The approximator of claim 1 wherein transformations performed by said transformer transform the first and second component portions into the first and second transformed values, respectively, such that the geometric argument defined from the first and second transformed values is an angular value between zero and pi/4 radians.

9. The approximator of claim 1 wherein the digital communication device comprises a modem and wherein said transformer and said estimator are embodied at the modem.

10. The approximator of claim 9 wherein the modem forms a portion of a communication station operable in a CDMA-based (code-division, multiple-access-based) cellular communication system, and wherein the data symbol of which the first and at least second component portions thereof are detected by said detector, comprise part of a data sequence communicated during operation of the communication system.

11. The approximator of claim 1 wherein the data symbol is defined in terms of the first component portion, the second component portion, and at least a third component portion, wherein said transformer first forms the first and second transformed values, and said estimator first estimates the Euclidean norm responsive to the summation of the first product value and the second product value, said transformer further for using coordinates associated with the Euclidean norm estimated by said estimator together with the third component portion to form a first iterative transformed value, and said estimator further for re-estimating the Euclidean norm responsive to the first iterative transformed value and the third transformed value.

12. The approximator of claim 11 wherein the data symbol forms an N-dimensional symbol having N component portions and wherein said transformer and said estimator are iteratively operable successively to perform N−1 transformations and estimations, the Euclidean norm estimated by said estimator at an N−1 iteration of the transformations and estimations performed by said transformer and said estimator forms the approximation of the Euclidean norm of all N component portions of the data symbol.

13. In a method of communicating by a digital communication device, an improvement of a method for forming an approximation of a Euclidean norm of a data symbol defined in terms of a first component portion and at least a second component portion, said method comprising:
  detecting indications of the first and at least second component portions of the data symbol;
  transforming the first component portion into a first transformed value and the second component portion into a second transformed value, the first and second transformed values, respectively, selected such that a geometric argument defined therefrom is within a selected angular rage; and
  estimating the Euclidean norm of the data symbol, the Euclidean norm estimated to be a summation of the first product value formed from the first transformed value and a second product value formed from the second transformed value.

14. The method of claim 13 wherein the selected angular range is comprised of a first angular subrange and a second angular subrange and wherein the first product value and the second product value used during said operation of estimating are further dependent upon in which of the first angular subrange and the second angular subrange that the geometric argument defined by the first and second transformed values is positioned.

15. The method of claim 14 wherein the first product value used during said operation of estimating is formed of a first multiplicand multiplied together with the first transformed value and wherein the second product value used during said operation of estimating is formed of a second multiplicand multiplied together with the second transformed value.

16. The method of claim 15 wherein the selected angular range is comprised of a first angular subrange and a second angular subrange, wherein the first multiplicand is determined in a first selected manner when the geometric argument defined by the first and second transformed values is positioned within the first angular subrange, and wherein the first multiplicand is determined in a second selected manner when the geometric argument defined by the first and second transformed values is positioned within to second angular subrange.

17. The method of claim 15 wherein the selected angular range is comprised of a first angular subrange and a second angular subrange, wherein the second multiplicand is determined in a first selected manner when the geometric argument defined by the first and second transformed values is positioned within the first angular subrange, and wherein the second multiplicand is determined in a second selected manner when the geometric argument defined by the first and second transformed values is positioned within the second angular subrange.

18. The method of claim 13 wherein the data symbol is defined in terms of the first component portion, the second component portion, and at least a third component portion, and wherein said operations of transforming and estimating are iteratively performed, coordinates of the Euclidean norm performed during a first iteration of said operation of estimating is used during a second iteration thereof to form a first iterative transformed value and the third component portion to form a third transformed value.

19. The method of claim 18 wherein a second iteration of estimating re-estimates the Euclidean norm responsive to the first iterative transformed value and the third transformed value.

20. The method of claim 19 wherein the data symbol forms an N-dimensional symbol having N component portions and wherein said operations of estimating and translating are iteratively performed N−1 times.

* * * * *

UNITED STATES PATENT AND TRADEMARK OFFICE
CERTIFICATE OF CORRECTION

PATENT NO. : 7,068,741 B2
APPLICATION NO. : 10/675576
DATED : June 27, 2006
INVENTOR(S) : Kenney It is certified that error appears in the above-identified patent and that said Letters Patent is hereby corrected as shown below:

Column 8,
Lines 2, 19, 20, "$\leqq$", each occurrence, should read --$\leq$--.

Column 12,

Line 4, "Fast Algorithm" should read -- $\theta_o = \pi/8$ --;

Line 7, "max" should read --min--;

Line 36, "$\leqq$", each occurrence, should read --$\leq$--.

Column 15,
Line 50, "rage" should read --range--.

Column 16,
Line 24, "to" should read --the--;

Signed and Sealed this

Thirteenth Day of February, 2007

JON W. DUDAS
*Director of the United States Patent and Trademark Office*